United States Patent
Eason et al.

(10) Patent No.: US 9,847,673 B2
(45) Date of Patent: Dec. 19, 2017

(54) ACTIVE POWER TRANSFER SWITCH CONTROL TO REDUCE SERVICE IMPACTS DUE TO ELECTRICAL POWER INTERRUPTIONS

(71) Applicant: Microsoft Technology Licensing, LLC, Redmond, WA (US)

(72) Inventors: Matthew Eason, Sammamish, WA (US); Michael Myrah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 14/820,549

(22) Filed: Aug. 6, 2015

(65) Prior Publication Data

US 2017/0040837 A1 Feb. 9, 2017

(51) Int. Cl.
*H02J 9/06* (2006.01)
*G06F 1/30* (2006.01)
*G06F 1/32* (2006.01)
*H02J 1/10* (2006.01)

(52) U.S. Cl.
CPC .............. *H02J 9/061* (2013.01); *G06F 1/30* (2013.01); *G06F 1/3287* (2013.01); *Y02B 60/1282* (2013.01)

(58) Field of Classification Search
CPC . H02J 1/10; G06F 1/30; G06F 1/3287; Y02B 60/1282
USPC .......................................................... 307/23
See application file for complete search history.

(56) References Cited

U.S. PATENT DOCUMENTS

| | | |
|---|---|---|
| 6,747,368 B2 | 6/2004 | Jarrett, Jr. |
| 7,119,457 B1 | 10/2006 | Flegel |
| 8,138,634 B2 | 3/2012 | Ewing et al. |
| 8,458,329 B2 | 6/2013 | Kolin et al. |
| 8,477,491 B1 | 7/2013 | Ross et al. |
| 8,560,677 B2 | 10/2013 | VanGilder et al. |
| 8,686,594 B2 | 4/2014 | Morales et al. |
| 8,867,193 B2 | 10/2014 | Rasmussen et al. |
| 8,907,520 B2 | 12/2014 | Chapel et al. |

(Continued)

OTHER PUBLICATIONS

"International Search Report and Written Opinion Issued in PCT Application No. PCT/US2016/045227", dated Nov. 10, 2016, 10 Pages.

(Continued)

*Primary Examiner* — Robert Deberadinis
(74) *Attorney, Agent, or Firm* — The Watson IP Group, PLC; Vladan M. Vasiljevic

(57) ABSTRACT

To prevent overloading of a shared secondary power feed, active transfer switches are controlled to switch discrete hardware from the shared secondary to a corresponding primary power feed, even if such a primary is currently nonoperational thereby resulting in deactivation of such hardware. A threshold amount of power draw from the shared secondary is established, such as to ensure that failure of a single primary can be accommodated, and active transfer switches are controlled so as to prevent such a threshold from being exceeded. Alternatively, or in addition, active transfer switches are controlled such that they, in the event of an interruption in the power being provided by the primary power feed, either switch to the shared secondary or, in accordance with the aforementioned control, do not switch despite the interruption in power.

20 Claims, 6 Drawing Sheets

(56) References Cited

U.S. PATENT DOCUMENTS

| | | |
|---|---|---|
| 8,994,213 B1 | 3/2015 | Czamara et al. |
| 2006/0072262 A1 | 4/2006 | Paik et al. |
| 2008/0258556 A1 | 10/2008 | Ewing et al. |
| 2011/0245988 A1 | 10/2011 | Ingels et al. |
| 2014/0208130 A1 | 7/2014 | Morales et al. |
| 2015/0083363 A1 | 3/2015 | Lindenstruth et al. |

OTHER PUBLICATIONS

"On-demand Architecture for Network-critical Physical Infrastructure", Retrieved on: May 13, 2015 Available at: http://www.mayflex.com/_assets/downloads/infrastruxure_lit.pdf.

Avelar, Victor., "Powering Single-corded Equipment in a Dual Path Environment", In White Paper 62, Retrieved on: May 13, 2015, 18 pages.

"Rack-mount Transfer Switches", Published on: Dec. 24, 2011 Available at: http://www.apc.com/products/family/?id=14.

"Using Static Transfer Switches to Enhance Data Center Availability and Maintainability", In White paper, Retrieved on: May 13, 2015, 16 pages.

"An open, Integrated Private Cloud solution for Cloud-Native Applications", In Technical White Paper, Mar. 2015, 12 pages.

US 9,847,673 B2

ACTIVE POWER TRANSFER SWITCH CONTROL TO REDUCE SERVICE IMPACTS DUE TO ELECTRICAL POWER INTERRUPTIONS

BACKGROUND

Modern computer networking hardware provides physically separate computing devices greater bandwidth to communicate with one another more efficiently than was possible with prior generations of networking hardware. Consequently, it has become more practical to perform digital data processing at locations remote from the user requesting such processing, or on whose behalf such processing is being performed. Large quantities of data processing capability are being aggregated into centralized locations that comprise dedicated hardware and support systems including hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "datacenter". By aggregating computing devices and dedicated hardware, a datacenter can offer processing services to its customers at an advantageous cost compared with what such customers would have to pay to independently acquire such processing and support services. The computing devices and dedicated hardware of a datacenter, however, can still comprise a significant cost, and the profitability of the datacenter can be improved to the extent that such costs can be reduced without negatively impacting a datacenter's operational reliability.

SUMMARY

Datacenters can comprise multiple independent primary power feeds that can independently provide power to distinct groupings of computing devices and other datacenter hardware. To provide redundancy, secondary, or backup, power feeds can be provided. To reduce cost, a single shared secondary power feed can be shared among multiple distinct groups of devices, where each distinct group of devices primarily receives power from one of multiple independent primary power feeds. In a power failure scenario on a primary feed, the distinct groups of devices drawing off that primary feed will failover to the shared secondary power feed in order to stay operational. To prevent the shared secondary power feed from being overloaded, active transfer switches can be controlled to switch discrete hardware, which is drawing power from the shared secondary power feed, to its corresponding primary power feed, even if such a primary power feed is currently nonoperational and thereby results in deactivation of such hardware. A threshold amount of power draw from the shared secondary power feed can be established, such as to ensure that the failure of a single primary power feed can be accommodated by the remaining capability of the shared secondary power feed, and active transfer switches can be controlled so as to prevent such a threshold amount of power draw from the shared secondary power feed from being exceeded. Alternatively, or in addition, active transfer switches can be controlled such that their default operation can be changed from automatically transitioning from a primary power feed to the shared secondary power feed, in the event of an interruption in the power being provided by the primary power feed, to a default operation in which the active transfer switches do not transition automatically to the shared secondary power feed, even if the delivery of power, from the primary power feed, is interrupted. Such default operation can be changed in advance of any interruption of power from the primary power feed connected to such active transfer switches, and can be subsequently undone, as the amount of power being consumed from the shared secondary power feed changes, without any impact on the services being provided by the hardware whose power is delivered through such active transfer switches, so long as the power from the primary power feeds to which such active transfer switches are coupled was not interrupted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
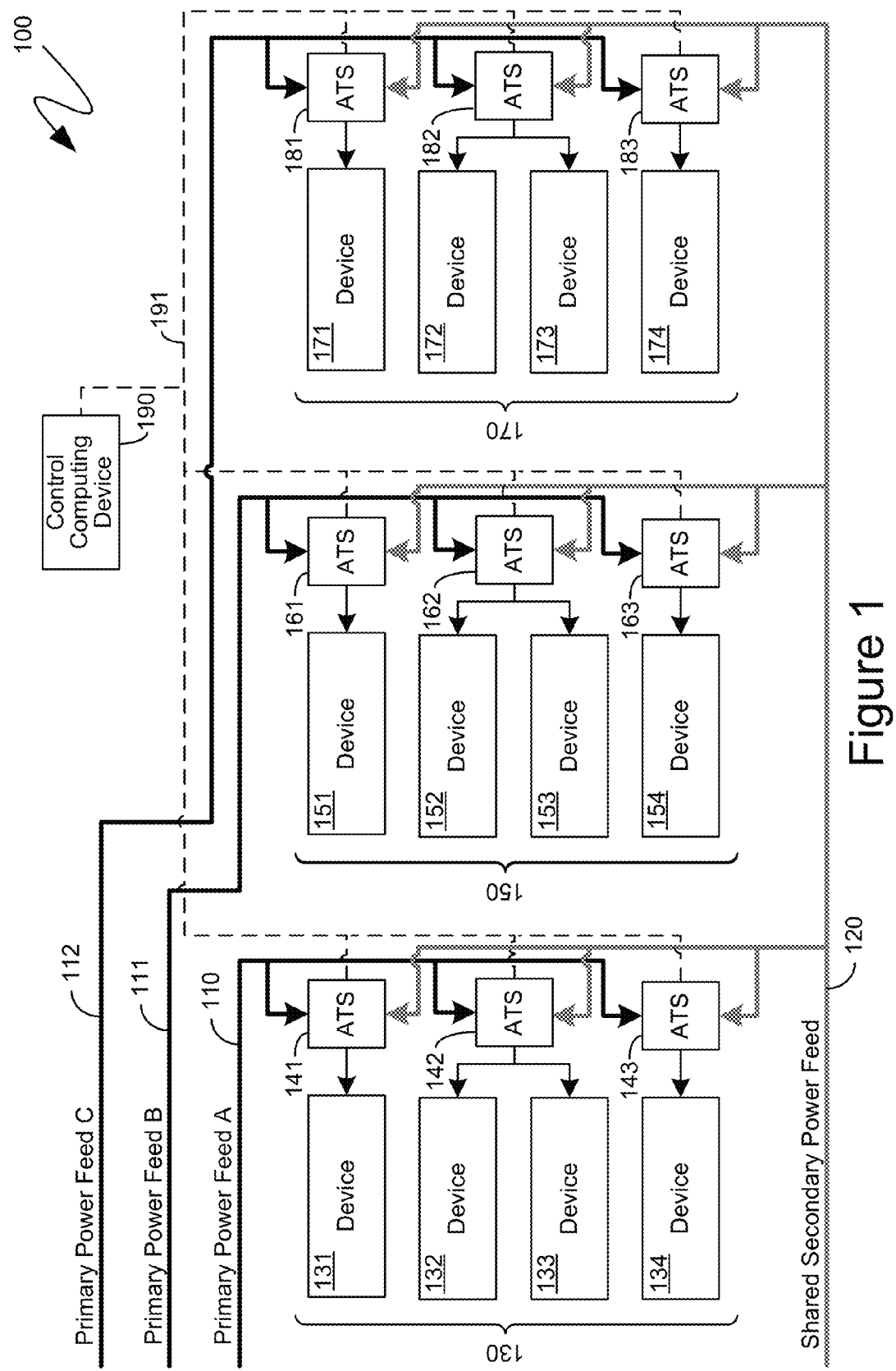
FIG. 1 is a system diagram of an exemplary system in which power is supplied to hardware either from independent primary power feeds or from a shared secondary power feed.

The following description relates to controlling active transfer switches so as to reduce service impacts due to electrical power interruptions. Datacenters can comprise multiple independent primary power feeds that can independently provide power to distinct groupings of computing devices and other datacenter hardware. To provide redundancy, additional power feeds in the form of secondary, or backup, power feeds can be provided. To reduce cost, a single secondary power feed can be shared among the distinct groups of devices that primarily receive power from multiple independent primary power feeds. To prevent the shared secondary power feed from being overloaded, active transfer switches can be controlled to switch discrete hardware, which is drawing power from the shared secondary power feed, to its corresponding primary power feed, even if such a primary power feed is currently nonoperational, thereby resulting in the deactivation of such hardware. A threshold amount of power draw from the shared secondary power feed can be established, such as to ensure that the failure of a single primary power feed can be accommodated by the remaining capability of the shared secondary power feed, and active transfer switches can be controlled so as to prevent such a threshold amount of power draw from the shared secondary power feed from being exceeded. Alternatively, or in addition, active transfer switches can be controlled such that their default operation can be changed from automatically transitioning from a primary power feed to the shared secondary power feed, in the event of an interruption in the power being provided by the primary power feed, to a default operation in which the active transfer switches do not transition automatically to the shared secondary power feed, even if the delivery of power, from the primary power feed, is interrupted. Such default operation can be changed in advance of any interruption of power from the primary power feed connected to such active transfer switches, and can be subsequently undone, as the amount of power being consumed from the shared secondary power feed changes, without any impact on the services being provided by the hardware whose power is delivered through such active transfer switches, so long as the power from the primary power feeds to which such active transfer switches are coupled was not interrupted.

The techniques described herein make reference to "hardware" or, variously, "datacenter hardware" and "computing hardware". As utilized herein, the term "hardware" means any physical device that consumes electrical energy and produces a mechanical or data processing result. Thus, as utilized herein, the term "datacenter hardware" means "hardware", as that term was explicitly defined above, that is installed in a datacenter; and the term "computing hardware" means hardware, again, as that term was explicitly defined above, that either directly performs computer processing, or which supports the performance of computer processing.

Additionally, while the techniques described herein are directed to datacenter environments, they are not meant to suggest a limitation of the described techniques specifically to such environments. To the contrary, the described techniques are equally utilizable in any context where controllable switches select from among multiple sources of electrical power for a set of devices whose continued operation in the face of electrical interruptions is desired.

Although not required, some descriptions below will be in the general context of computer-executable instructions, such as program modules, being executed by a computing device. More specifically, the below descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates collections, or defined sets, of computing hardware, such as could be found within a typical datacenter. For example, devices 131, 132, 133 and 134 can be organized or arranged into one or more racks or other like physical arrangements. For ease of reference, the term "rack" will be utilized to refer to a discrete collection of computing devices, or other computing hardware, even if such devices share an actual, physical device rack with other devices, or even if such devices are spread across multiple actual, physical device racks. Thus, within the context of the exemplary system 100 shown in FIG. 1, the aforementioned devices 131, 132, 133 and 134 are illustrated as being part of the rack 130. In an analogous manner, devices 151, 152, 153 and 154 are illustrated as being part of the rack 150 and devices 171, 172, 173 and 174 are illustrated as being part of the rack 170. Although illustrated as rack-mounted server computing devices, the illustrated devices 131, 132, 133, 134, 151, 152, 153, 154, 171, 172, 173 and 174 are meant to represent any form of computing hardware, including storage devices, networking devices, monitoring devices, control devices, and the like, and are not meant to represent only rack-mounted server computing devices.

As will be recognized by those skilled in the art, to provide increased reliability, datacenters can receive electrical power from multiple, independent electrical power feeds. For example, exemplary system 100 of FIG. 1 illustrates four independent electrical power feeds, in the form of the primary power feeds 110, 111 and 112, and in the form of a separate, shared secondary power feed 120. Although not specifically illustrated in FIG. 1, each of the four independent electrical power feeds can comprise independent electrical delivery hardware, such as transformers, uninterruptable power supplies, switching stations, bus bars, and other like electrical delivery hardware, thereby providing independence such that, if the electrical delivery hardware of the independent electrical power feeds were to fail, the other electrical power feeds would remain operational and able to provide electrical power. Within the datacenter, different racks, or collections of hardware, can be primarily powered by electrical power received from independent electrical power feeds. For example, the rack 130 can comprise hardware that can be primarily powered by electrical power received from the primary power feed 110. Analogously, the rack 150 can comprise hardware that can be primarily powered by electrical power received from the primary power feed 111, and the rack 170 can comprise hardware that can be primarily powered by electrical power received from the primary power feed 112. In such an arrangement, if one of the primary power feeds 110, 111 or 112 were to experience a failure, and became incapable of delivering electrical power, only a portion of the hardware of the datacenter would be negatively impacted. For example, if the exemplary primary power feed 110 were to experience a failure, and become incapable of delivering electrical power, only the devices 131, 132, 133 and 134 would be affected, and the remaining devices, such as of the racks 150 and 170, would remain unaffected, as their power was being obtained from power feeds that are independent of the primary power feed 110, namely the exemplary primary power feeds 111 and 112.

To provide backup power a secondary power feed can be utilized. Thus, returning to the above example where the primary power feed 110 ceases to be able to provide electrical power to the rack 130, the devices of the rack 130 can continue normal operation if they can receive electrical power from a backup power feed, such as the exemplary shared secondary power feed 120. As indicated previously, exemplary shared secondary power feed 120 can also be independent of other power feeds, such as the exemplary primary power feeds 110, 111 and 112. Thus, interruptions in one of the primary power feeds, such as the exemplary interruption in the primary power feed 110, need not affect the delivery of power through the shared secondary power feed 120 and, consequently, so long as the devices of the rack 130 are capable of receiving electrical power from the shared secondary power feed 120, they can experience no downtime even if the primary power feed 110 ceases to be able to provide them with electrical power.

To facilitate switching between sources of electrical power, Active Transfer Switches (ATSes), such as the exemplary active transfer switches 141, 142 and 143 can be utilized. As will be recognized by those skilled in the art, active transfer switches are configured to automatically transition from a primary source of power to a secondary, backup source of power in the event that the primary source of power is no longer capable of providing electrical power. Thus, returning to the above example, if the exemplary primary power feed 110 were no longer capable of providing electrical power to, for example, the device 131, the active transfer switch 141 coupled thereto could automatically transition to the shared secondary power feed 120 and the device 131 would receive continuous electrical power, despite the interruption in the ability of the primary power feed 110 to provide such electrical power. For example, the active transfer switch 141 could transition within a matter of milliseconds such that the inherent capacitance of the power supply of the device 131 could continue to provide electrical power during the short transition period from when electrical power from the primary power feed 110 was interrupted and the active transfer switch 141 switched to the shared secondary power feed 120. In such a manner, processing or other functionality performed by the device 131 would continue uninterrupted despite an interruption in the ability of the primary power feed 110 to provide electrical power to the device 131.

A single collection of devices, such as the exemplary rack 130, can have one or more active transfer switches coupled thereto, switching between various sources of electrical power for the devices of such a rack. For example, the exemplary device 131 can have a dedicated active transfer switch 141, as can the exemplary device 134 have a dedicated active transfer switch 143. By contrast, the devices 132 and 133 can share an active transfer switch 142. In other instances more than two devices can receive electrical power from a power source selected through a single active transfer switch. For ease of illustration, however, exemplary active transfer switches 161, 162, 163, 181, 182 and 183 are illustrated as being coupled to various computing devices in the same manner as described with reference to exemplary rack 130.

Active transfer switches, such as those illustrated in the exemplary system 100 of FIG. 1, can have their operation externally controlled, such as by the exemplary computing device 190. For example, the active transfer switches can comprise communicational couplings, such as a serial port, a wired or wireless network connection, or other like communicational coupling. In such a manner, a communicational connection 191 can be established between the control computing device, such as the exemplary computing device 190 and one or more of the active transfer switches, such as the exemplary active transfer switches illustrated in FIG. 1. Through such a communicational connection 191, the control computing device 190 can instruct the active transfer switches to select one specific source of electrical power, from among the multiple power feeds to which such switches are connected, can change the operation that such switches perform in the event of interruptions in the delivery of power from one or more of the multiple power feeds to which such switches are connected, and can otherwise change the operation of such active transfer switches.

The active transfer switches allow the hardware, to which they are connected, to draw electrical power from a primary power source or from one or more backup power sources. For example, the active transfer switch 141 allows the device 131 to be provided power from the primary power feed 110, or from the shared secondary power feed 120. Thus, for example, if the delivery of electrical power, to the device 131, from the primary power feed 110, were to be interrupted, the active transfer switch 141 could switch to the shared secondary power feed 120, and the device 131 could receive electrical power therefrom, thereby enabling the device 131 to continue operation despite the interruption in the delivery of electrical power from the primary power feed 110.

To provide such backup power, namely in the event that a primary power feed can no longer provide electrical power to the devices to which it is connected, each rack of devices can each have its own independent secondary power feed coupled thereto, such as through active transfer switches. As will be recognized by those skilled in the art, however, the infrastructure required to provide so many independent power feeds can be expensive. Consequently, to reduce cost, a single power feed can provide backup power to multiple racks, or other collections of computing devices, that are otherwise being primarily provided power from multiple, independent primary power feeds. Such a single backup power feed can, thus, be shared to provide backup power to multiple, independent primary power feeds. For example, as illustrated by the exemplary system 100 of FIG. 1, the shared secondary power feed 120 can provide backup power to the rack 130, primarily receiving power from the primary power feed 110. The shared secondary power feed 120 can also provide backup power to the rack 150, which primarily receives power from the primary power feed 111, and to the rack 170, which primarily receives power from the primary power feed 112.

But while a single backup power feed that is shared to provide backup power to multiple, independent primary power feeds, can reduce the cost of providing backup power, such a single power feed can become overloaded if too many devices seek to draw power from it. The mechanisms described below optimize utilization of the shared backup power feed and decrease the customer impact of power interruptions within the datacenter. More specifically, the mechanisms described herein afford a number of advantages over the current state of the art. One such advantage is in reducing the cost of providing backup power by utilizing only a single, shared backup power feed. Such a single, shared backup power feed obviates the need for multiple, redundant power delivery hardware including, for example, multiple transformers, multiple substations, multiple distribution paneling, and other like electrical power delivery infrastructure. Another advantage is in increasing the availability of services provided by the datacenter during power interruptions. More specifically, and as will be detailed below, the mechanisms described transition devices from utilizing power from the shared backup power feed back to those devices' primary power feeds. In instances where those devices' primary power feeds have already been repaired, and in instances where those devices improperly transitioned away from drawing power from such primary power feeds in the first place, the additional capacity of the shared backup power feed that is made available by the described mechanisms increases the chances that devices whose primary power feeds fail will continue to operate uninterrupted because sufficient power is available from the shared backup power feed. Yet another advantage is in increasing the availability of more important services during power interruptions, by ensuring that such important services have sufficient power capacity available to them from the shared backup power feed.

Figure 2:
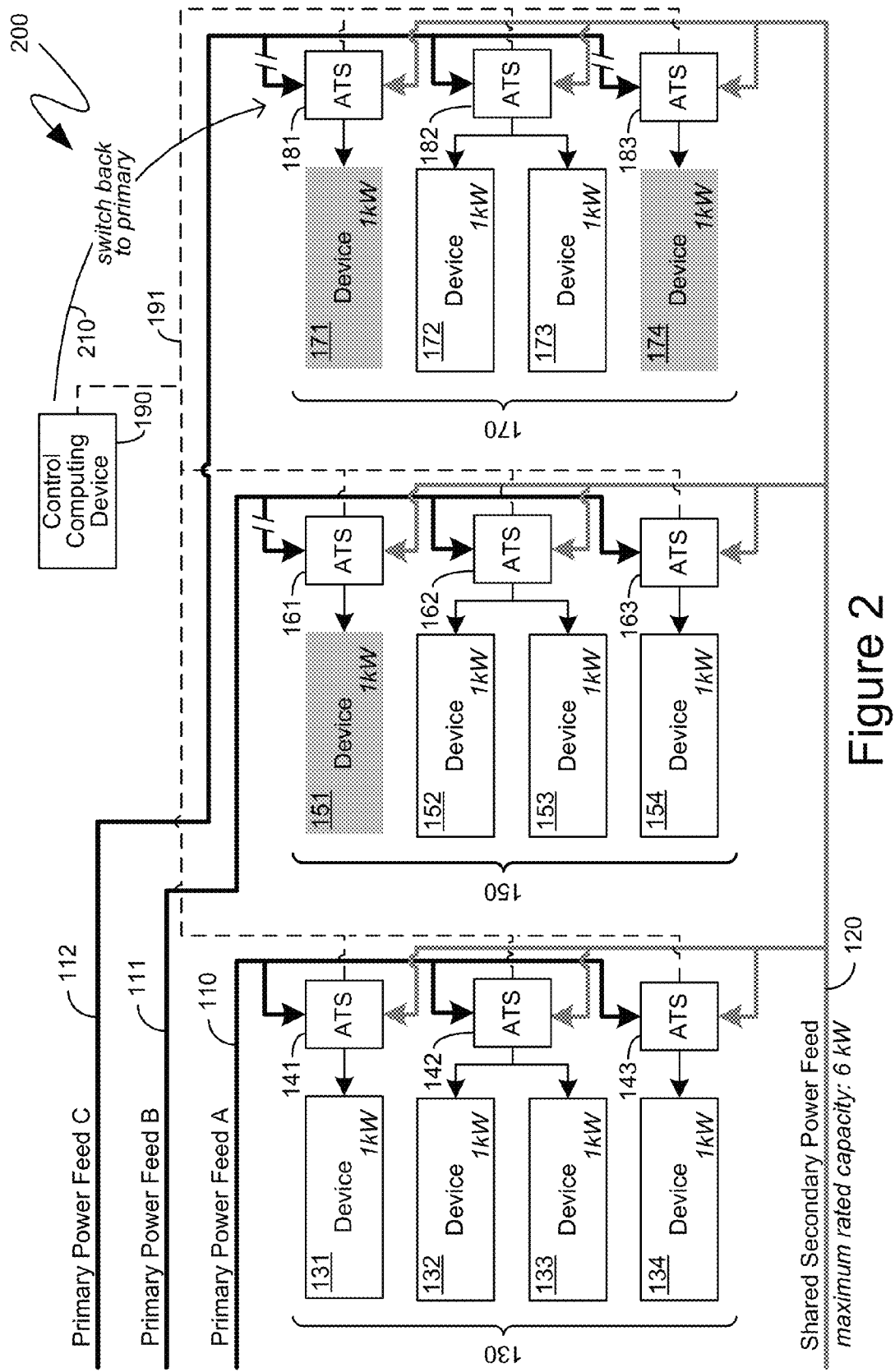
FIG. 2 is a block diagram of an exemplary system in which active transfer switches are controlled to reduce service impacts due to electrical power interruptions.

Turning to FIG. 2, the exemplary system 200 shown therein illustrates one scenario in which the shared secondary power feed 120 could be overloaded and could fail to provide sufficient backup power; a scenario which the mechanisms described herein ameliorate. More specifically, and as illustrated in the exemplary system 200 of FIG. 2, various devices, or hardware, can be drawing electrical power from the shared secondary power feed 120. For example, the device 151 can no longer be receiving power from the primary power feed 111 and can, instead, be drawing electrical power from the shared secondary power feed 120, by virtue of the active transfer switch 161 having switched from the primary power feed 111 to the shared secondary power feed 120. As will be recognized by those skilled in the art, there can be any number of scenarios under which the device 151 can no longer receive power from the primary feed 111, while one or more of the other devices of the rack 150, such as the exemplary devices 152, 153 and 154, can continue to receive power from the primary power feed 111. For example, the device 151 can have had a momentary increase in the amount of power it sought to consume, and, thereby, caused a circuit breaker, or other like power delivery control mechanism or device, to trigger an interruption in the flow of electrical power from the primary power feed 111 to the device 151. Such an interruption can have caused the active transfer switch 161 to switch to the shared secondary power feed 120 and, if the increase in the amount of power that the device 151 sought to consume was, indeed, momentary, then the device 151 can continue to operate properly, except now drawing electrical power from the shared secondary power feed 120 instead of the primary power feed 111. The device 151 can continue to do so until the interruption between it and the primary power feed 111 is repaired. In some instances, even after such an interruption is repaired, the device 151 can continue to draw power from the shared secondary power feed 120.

In the exemplary system 200 of FIG. 2, devices 171 and 174 can, similarly, be drawing electrical power from the shared secondary power feed 120, by virtue of their corresponding active transfer switches, namely the active transfer switches 181 and 183, respectively, having switched to the shared secondary power feed 120, such as due to an interruption in the delivery of electrical power from the primary power feed, namely the exemplary primary power feed 112. For purposes of illustration, and ease of description, each of the devices 151, 171 and 174 can draw one kilowatt of power. As will be recognized by those skilled in the art, the hardware of a datacenter can draw greater quantities of power, either individually or in aggregate, and the one kilowatt designation is strictly exemplary and for ease of reference and description. Also for purposes of illustration, and simplicity of description, the shared secondary power feed can have a maximum rated capacity of six kilowatts. Again, as will be recognized by those skilled in the art, a power feed to a datacenter can have a much higher maximum rated capacity, such as on the order of hundreds of kilowatts, and the six kilowatt designation is, again, strictly exemplary and for ease of reference and description.

Continuing with such an example, the three devices 151, 171 and 174 can be drawing an aggregate of three kilowatts of electrical power from the shared secondary power feed 120, thereby leaving only three kilowatts of electrical capacity remaining. If a primary power feed were to fail and no longer be able to provide any electrical power, such as, for example, if the primary power feed 110 were to fail, the hardware primarily receiving power from the primary power feed 110, such as, for example, the exemplary rack 130, would need to transition to obtaining power from the shared secondary power feed 120 if that hardware was to continue its operations uninterrupted. However, as can be seen from the illustrative example shown by the system 200 of FIG. 2, if the primary power feed 110 were to fail, the active transfer switches 141, 142 and 143 would switch to the shared secondary power feed 120, causing the devices 131, 132, 133 and 134 to each attempt to draw one kilowatt from the shared secondary power feed 120, resulting in an overload condition for the shared secondary power feed as seven devices, namely the devices 131, 132, 133, 134, 151, 171 and 174, each attempt to draw one kilowatt of electrical power, or seven kilowatts of electrical power in aggregate, from a power feed whose maximum rated capacity is only six kilowatts. As will be recognized by those skilled in the art, such an overload condition can result in some or all of those devices failing to receive sufficient electrical power.

According to one aspect, therefore, a control computing device, such as the exemplary computing device 190, can monitor the power being drawn from the shared secondary power feed 120 and can proactively act to prevent, or minimize, the above-detailed disruption. For example, a threshold amount of power to be drawn from the shared secondary power feed 120 can be established, and a control computing device can control one or more of the active transfer switches should the power attempting to be drawn from the shared secondary power feed 120 exceed such an established threshold. The established threshold amount of power can be based on the maximum rated capacity of the shared secondary power feed 120 as well as an amount of power capacity that would be required should one of the primary power feeds fail. For example, utilizing the above-enumerated exemplary power capacities, an initial threshold can be established of only allowing two kilowatts of electrical power to be drawn from the shared secondary power feed, absent a failure of one of the primary power feeds, because such a threshold would leave four kilowatts of electrical power capacity remaining, thereby ensuring that the shared secondary power feed 120 has sufficient electrical power capacity to support all of the devices that would be impacted if a primary power feed were to fail, since, in the illustrated system 200 of FIG. 2, each primary power feed provides a maximum of four kilowatts to its rack of devices.

Were a threshold to be established, such as the exemplary two kilowatt threshold, then, when the last of the devices 151, 171 and 174 attempted to draw power from the shared secondary power feed 120, the computing device 190 could detect that greater than such a threshold amount of power was being drawn from the shared secondary power feed 120 and could take action to reduce the amount of power being drawn from the shared secondary power feed 120 prior to a failure of one of the primary power feeds. For example, the controlled computing device 190 can issue an instruction 210 to one of the active transfer switches, such as the exemplary active transfer switch 181, to switch back to the primary power feed 112 to which that active transfer switch 181 is coupled. If the interruption between the primary power feed 112 and the device 171 has been repaired, such as if a circuit breaker has been reset, then the switching of the active transfer switch 181, in response to the command 210, can enable the device 171 to continue operation, except now drawing power from the primary power feed 112. Conversely, if the interruption between the primary power feed 112 and the device 171 has not been repaired, then the switching of the active transfer switch 181, in response to the command 210, can cause the device 171 to cease operation, as such a device can no longer receive electrical power from the primary power feed 112. In either instance, however, the device 171 can no longer draw electrical power from the shared secondary power feed 120, thereby reducing the amount of power being drawn from the shared secondary power feed 120 back below an established threshold. Should one of the primary power feeds, such as the exemplary primary power feed 110, fail, the shared secondary power feed 120, providing only an aggregate of two kilowatts of electrical power to the two devices still drawing power therefrom, namely the devices 151 and 174, will be able to accommodate all of the devices, namely devices 131, 132, 133 and 134, that were drawing electrical power from the now failed primary power feed 110, and all of those devices of the rack 130 will be able to continue operation without interruption.

According to one aspect, the instruction 210, from the control computing device 190, to the active transfer switch 181, can be based on processes being executed by the computing device 171. More specifically, the control computing device 190 can take into account which services, being provided by the datacenter, will be impacted by the instruction 210, and can direct the instruction 210 to an active transfer switch, such as the exemplary active transfer switch 181, that is coupled to hardware whose ceasing of operations will have the least impact. Various factors can be considered by the control computing device 190 as to which hardware to potentially deactivate, such as through the issuance of the instruction 210 to an active transfer switch, causing that active transfer switch to transition back to a primary power feed that may be incapable of providing electrical power to the hardware coupled to such active transfer switch. One such factor can be whether the hardware that would be potentially deactivated provides primary, or backup functionality. For example, hardware providing backup storage can be chosen, such as by the control computing device 190, to be potentially deactivated prior to hardware providing primary storage. Another factor can be whether the hardware that would be potentially deactivated is providing services utilized for testing new functionality, or whether it is being utilized for providing "production" services. For example, hardware providing functionality for services that are only being tested, prior to being made more generally available, can be chosen, such as by the control computing device 190, to be potentially deactivated prior to hardware providing production services.

Other factors that can be considered by the control computing device 190 as to which hardware to potentially deactivate can include factors directed to contractual considerations. For example, hardware performing processing, or providing services, that are offered for free, can be selected by the control computing device 190 to be potentially deactivated prior to hardware that provide for-fee services. As another example, hardware performing processing, or providing services, to customers that have signed a legal agreement requiring a certain reliability, or "uptime", such as a Service Level Agreement (SLA) can be selected by the control computing device 190 to be potentially deactivated in accordance with such an SLA. More specifically, services whose SLA allows for reduced reliability can have the hardware supporting such services selected, such as by the control computing device 190, to be potentially deactivated prior to hardware that supports services whose SLA requires increased reliability.

Still other factors that can be considered by the control computing device 190 to select which hardware to potentially deactivate can include factors directed to the fungibility of provided services. As indicated previously, backup services can be selected for potential deactivation prior to primary services. Another example can be processing or services that are replicated, either on other hardware within the same datacenter, or across multiple datacenters. Hardware supporting processing or services that can be replicated elsewhere can be selected for potential deactivation prior to hardware supporting processes that are unique and not replicated elsewhere. Analogously, hardware supporting processing responding to requests that can be directed to other hardware, again either within the same datacenter, or replicated across multiple datacenters, can be selected, such as by the control computing device 190, for potential deactivation prior to hardware supporting processes that can uniquely respond to requests.

In determining which hardware to potentially deactivate, such as by issuing the instruction 210, to an active transfer switch 181 to switch back to a primary power feed, the control computing device 190 can take into account other hardware whose processing or functionality would be affected by the hardware that could be potentially deactivated. For example, processing hardware executing a standalone process can only impact the performance of that standalone process should such processing hardware no longer be supplied with electrical power. By contrast, as another example, hardware providing storage functionality can impact many different processes, being executed across multiple different hardware devices, should such storage hardware no longer be supplied with electrical power. Consequently, in selecting which hardware to potentially deactivate, the control computing device 190 can select processing hardware executing standalone processes over, for example, storage hardware providing storage functionality for many different processes being executed by multiple different hardware devices across the datacenter.

Figure 3:
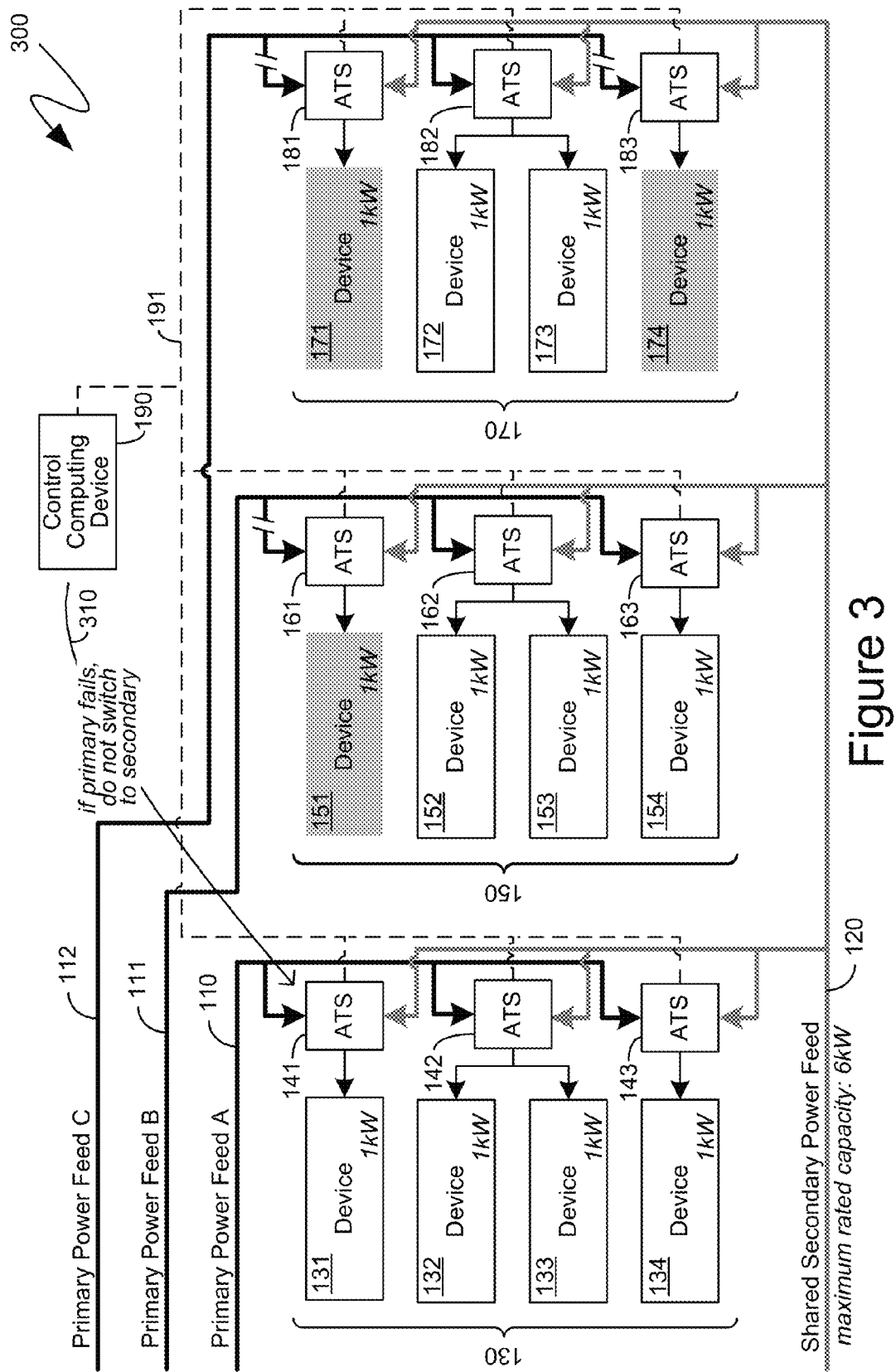
FIG. 3 is a block diagram of another exemplary system in which active transfer switches are controlled to reduce service impacts due to electrical power interruptions.

While the above described mechanisms are directed to reducing a quantity of electrical power currently being consumed from the shared secondary power feed 120, and, thereby, providing for robustness in the event of a failure of a primary power feed, an alternative mechanism can be directed to reducing a quantity of electrical power that would be consumed should a primary power feed experience a failure. More specifically, and with reference to FIG. 3, the exemplary system 300 shown therein illustrates an analogous situation to that described above with reference to exemplary system 200 shown in FIG. 2. More specifically, and as illustrated in FIG. 3, the devices 151, 171 and 174 can each be drawing one kilowatt, or three kilowatts in aggregate, from the shared secondary power feed 120, leaving only three kilowatts of remaining power capacity, utilizing the aforementioned exemplary limits. Rather than causing one of the devices currently drawing power from the shared secondary power feed 120, such as the exemplary devices 151, 171 or 174, to transition back to drawing power from its corresponding primary power feed, so that the capacity of this shared secondary power feed can be sufficient to accommodate the failure of one of the primary power feeds such as, for example, exemplary primary power feed 110, the control computing device 190 can instruct one or more of the active transfer switches coupled to the primary power feed 110, such as the exemplary active transfer switches 141, 142 or 143, to not automatically transition to the shared secondary power feed 120 should the primary power feed 110 experience a failure.

For example, an instruction 310 can be directed, from the exemplary control computing device 190, to the exemplary active transfer switch 141, instructing the active transfer switch 141 to not transition to the shared secondary power feed 120 should the primary power feed 110 fail. As can be seen, with such an instruction, should the primary power feed 110 fail, the active transfer switches 142 and 143 can transition to the shared secondary power feed, causing the devices 132, 133 and 134 to attempt to draw power from the shared secondary power feed. The devices 132, 133 and 134 now attempting to draw power from the shared secondary power feed, in combination with the devices 151, 171 and 174 that were already drawing power from the shared secondary power feed can, in aggregate, still not exceed the maximum rated capacity of the shared secondary power feed 120, since the device 131 did not attempt to draw any power from the shared secondary power feed 120 because the active transfer switch 141 did not transition to the shared secondary power feed 120, in accordance with the instruction 310. Consequently, adequate power backup to the exemplary primary power feed 110 was provided by the shared secondary power feed 120 without the control computing device 190 first having to cause at least one of the devices 151, 171 or 174 to transition back to consuming power from its corresponding primary power feed and, thereby, possibility terminating the operation of one of those devices.

The instruction 310, to an active transfer switch to not transition to the shared secondary power feed can avoid negatively impacting corresponding hardware so long as the primary power feed, connected to such an active transfer switch, does not fail. If the primary power feed, such as the exemplary primary power feed 110, does not fail, the device 131 can continue to operate utilizing power from the primary power feed 110. If the control computing device 190 subsequently detects that the power being consumed from the shared secondary power feed 120 decreases, such as, for example, if the active transfer switch 161 transitions back to the primary power feed 111, thereby causing the device 151 to no longer draw power from the shared secondary power feed 120, the control computing device 190 can issue another instruction that can undo the change made by the instruction 310, and can, instead, instruct the active transfer switch 141 to transition to the shared secondary power feed 120 should the primary power feed 110 fail. If such a subsequent instruction is provided to the active transfer switch 141 prior to a failure of the primary power feed 110, the device 131 can never have been impacted, and yet potential overloading of the shared secondary power feed 120 can have been avoided.

The mechanisms described above, while described individually, can also be used together. For example, certain active transfer switches can be instructed to transition back to a primary power feed, thereby decreasing the power draw from the shared secondary power feed 120 while, simultaneously, other active transfer switches can be instructed to not transition to the shared secondary power feed 120 should their primary power feeds fail. Additionally, the actual power being utilized from the shared secondary power feed 120 can be repeatedly, or continuously, monitored and the active transfer switches that are instructed not to transition to the shared secondary power feed 120, and the active transfer switches that are instructed to transition back to a primary power feed, can be adjusted in accordance with such monitoring of the actual power being drawn from the shared secondary power feed 120.

Figure 4:
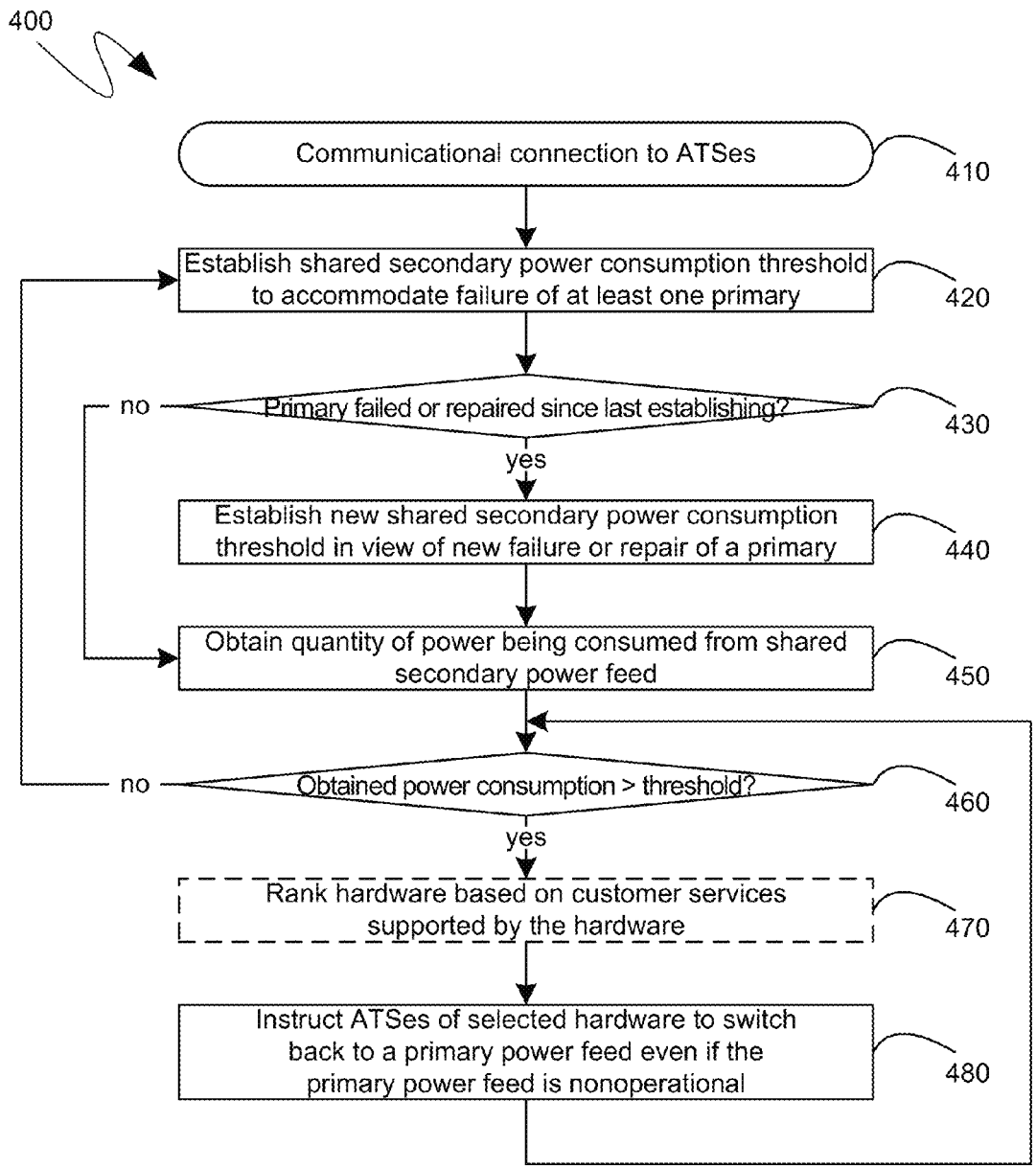
FIG. 4 is a flow diagram of an exemplary control of active transfer switches to reduce service impacts due to electrical power interruptions.

Turning to FIG. 4, exemplary flow diagram 400 shown therein illustrates an exemplary series of steps by which service impacts due to electrical power interruptions can be minimized through active transfer switch control. Initially, at step 410, a communicational connection can be established with various active transfer switches. Subsequently, at step 420, a power consumption threshold can be established with respect to a quantity of electrical power being consumed from a shared secondary power feed. For example, at step 420, such a threshold can be established to retain a sufficient amount of electrical power capacity such that, should at least one primary power feed fail, the shared secondary power feed will have sufficient capacity to accommodate the hardware that was previously consuming electrical power from the now failed primary power feed. At step 430, a check can be made as to whether the primary power feed has either failed or been repaired since the threshold, at step 420, was last established. If such changes have occurred, a new threshold can be established at step 440 taking into account the failure or repair of the primary power feed. For example, if one primary power feed fails, a threshold amount of power that can be consumed from the shared secondary power feed can be increased to accommodate for such a failure of one of the primary power feeds. Analogously, if a primary power feed is repaired, then the threshold amount of power that can be consumed by the shared secondary power feed can be decreased commensurately. If, at step 430, it is determined that no such changes have occurred, processing can skip step 440 and proceed to step 450.

At step 450, a quantity of power being consumed from the shared secondary power feed can be obtained, such as through direct measurement, or through extrapolation. At step 460, a determination can be made as to whether the obtained quantity of power being consumed from the shared secondary power feed is greater than the threshold that was previously established. If it is not greater than the threshold, processing can return to step 420. Conversely, if, at step 460, it is determined that the quantity of power being consumed from the shared secondary power feed is greater than the threshold, processing can proceed to step 480 and the active transfer switches of selected hardware can be instructed to switch back to a corresponding primary power feed. As described in detail above, the generation of such an instruction, at step 480, can result in active transfer switches switching back to a power feed that is nonoperational and, thereby, terminating the operation of the corresponding hardware, at least until such a primary power feed is repaired. According to one aspect, prior to performing step

480, as an optional step 470, illustrated as dashed lines to indicate its optionality, hardware can be ranked based on the services and processing supported by such hardware. As indicated previously, such a ranking can be performed based on various factors, and the ranking performed at step 470 can inform the decision, at step 480, as to which active transfer switches are to receive such an instruction.

Figure 5:
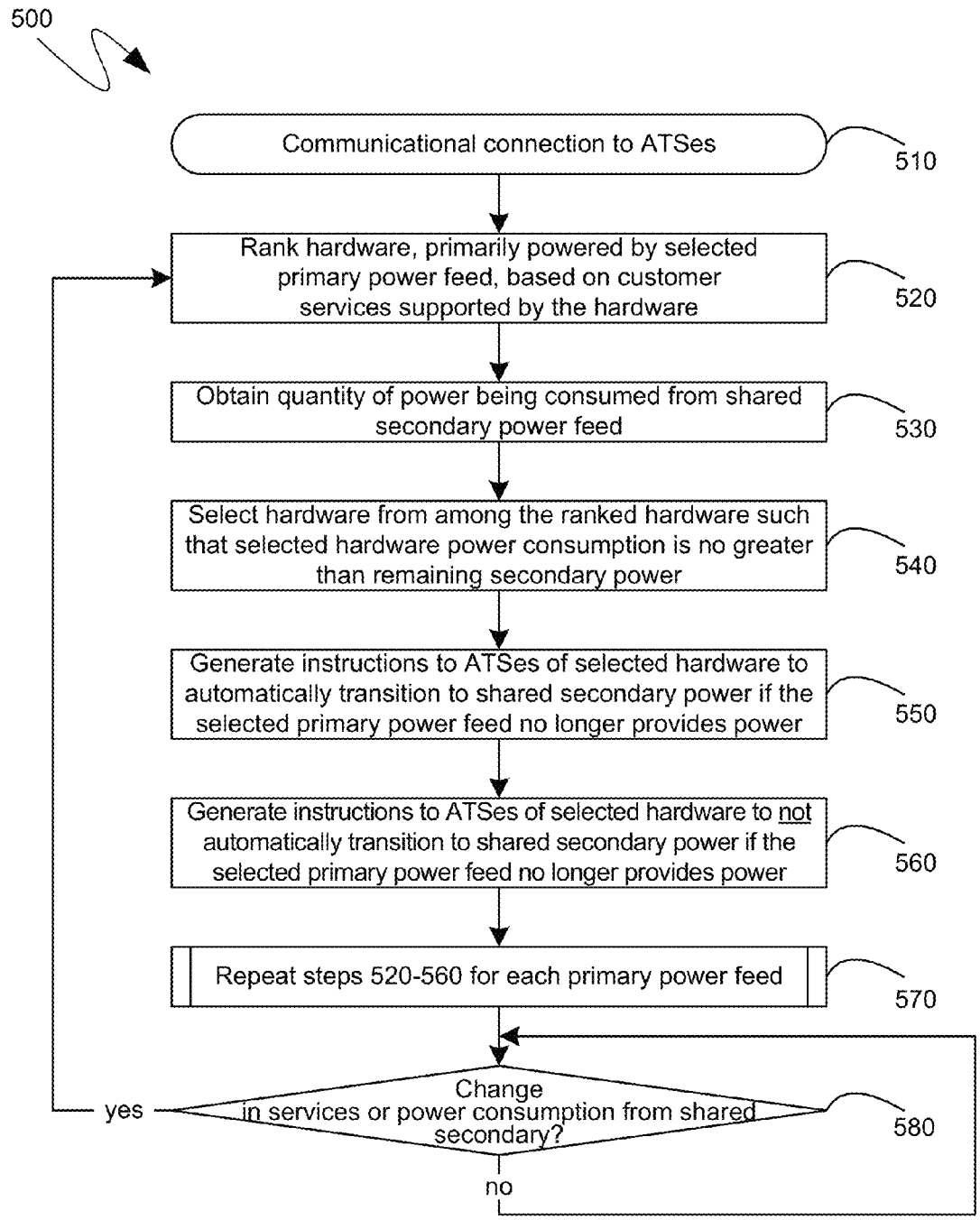
FIG. 5 is a flow diagram of another exemplary control of active transfer switches to reduce service impacts due to electrical power interruptions.

Turning to FIG. 5, the flow diagram 500 shown therein illustrates another exemplary series of steps by which service impacts due to electrical power interruptions can be minimized through active transfer switch control. Initially, as before, at step 510, a communication connection can be established with active transfer switches. Subsequently at step 520, for a specific primary power feed, the hardware receiving power from such a primary power feed can be linked, such as detailed above, based on the services and processing supported by such hardware. At step 530, a quantity of power being consumed from they shared secondary power feed can be obtained. At step 540, based on the ranking of step 520 and the quantity of power obtained at step 530, hardware can be selected from among the hardware primarily being powered by the primary power feed whose hardware was ranked such that the power consumption of the selected hardware is no greater than the remaining capacity of the shared secondary power feed to provide power. At step 550, then, instructions can be generated and transmitted to the active transfer switches of the selected hardware, instructing those active transfer switches to automatically transition to the shared secondary power feed if the primary power feed fails. At step 560, converse instructions can be generated and transmitted to active transfer switches of the remaining hardware, receiving power from the primary power feed, instructing such active transfer switches to not automatically transition to the shared secondary power feed if the primary power feed fails. At step 570, steps 520 through 560 can be repeated, separately, for each primary power feed. At step 580 a check can be made as to whether there was a change, either in the services being supported by the hardware, ordering the quantity of power consumption from the shared secondary power feed. Such a check can be repeated unless a change is detected, in which case processing can return to step 520.

Figure 6:
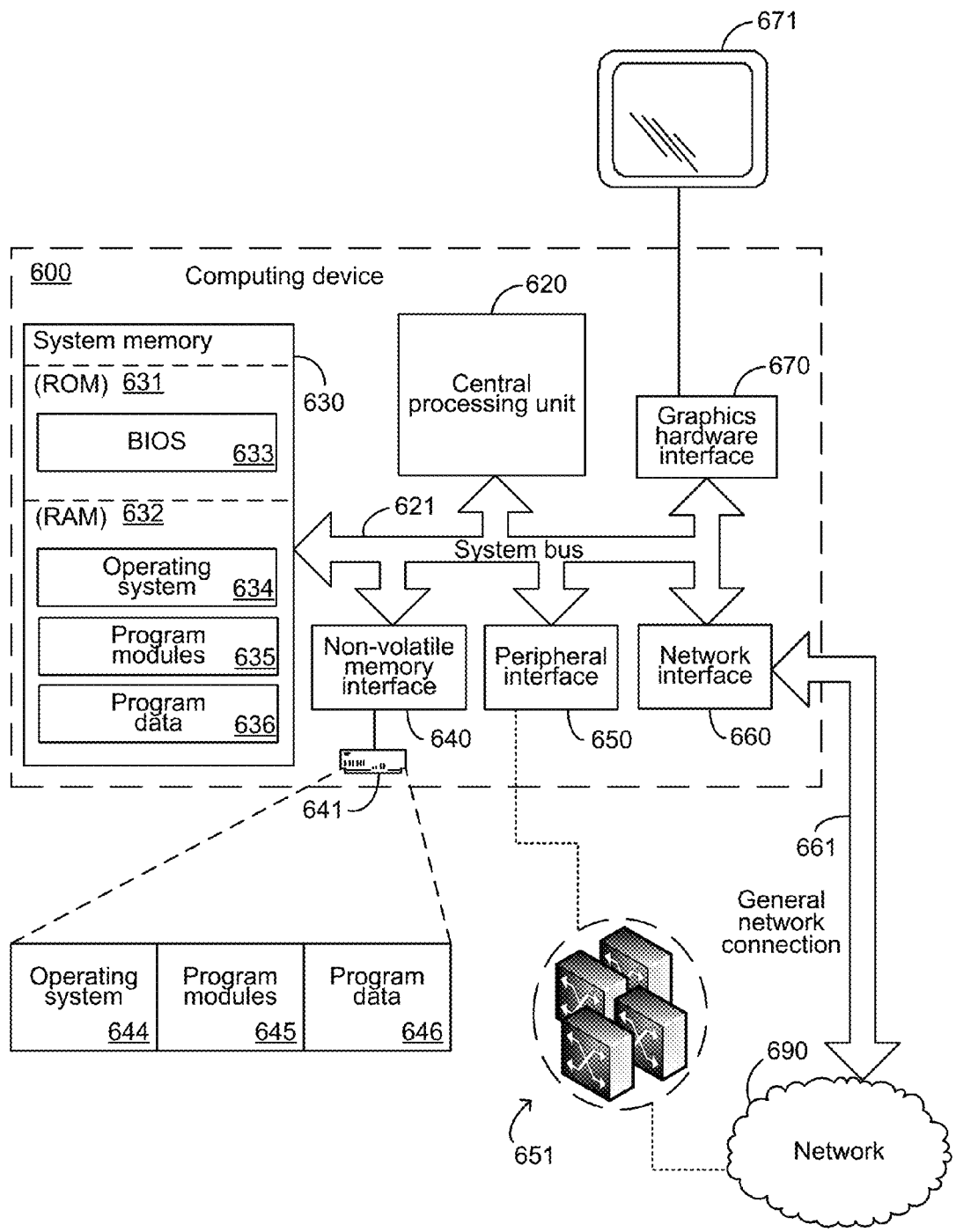
FIG. 6 is a block diagram of an exemplary computing device implementing active transfer switch control.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 670 and a display device 671, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of controlling active transfer switches in a datacenter to reduce impact on the provision of services by the datacenter, from electrical power interruptions in the datacenter, the method comprising: obtaining an amount of power being consumed by datacenter hardware from a shared secondary power feed; determining that the shared secondary power feed will be incapable of providing sufficient power to the datacenter hardware if a first primary power feed fails; and generating, in response to the determining, instructions to a first selected set of active transfer switches that switch between a primary power feed and the shared secondary power feed, the instructions instructing the first selected set of active transfer switches to either: switch back to the primary power feed to which they are connected even if that primary power feed is currently nonoperational; or to not switch to the shared secondary power feed if the primary power feed to which they are connected fails.

A second example is the method of the first example, wherein the datacenter comprises: multiple primary power feeds, each one of the multiple primary power feeds providing primary power to a distinct subset of the datacenter hardware; and the shared secondary power feed, which, by itself, provides backup power to multiple ones of the distinct subsets of the datacenter hardware.

A third example is the method of the second example, further comprising: establishing a threshold amount of power consumption such that a remaining power capacity of the shared secondary power feed exceeds a power capacity of one of the multiple primary power feeds; wherein the determining comprises determining that the obtained amount of power currently being consumed by datacenter hardware from the shared secondary power feed exceeds the pre-established threshold amount of power consumption.

A fourth example is the method of the third example, further comprising: re-establishing the threshold amount of power consumption when one of the multiple primary power feeds either fails or is repaired of a prior failure.

A fifth example is the method of the second example, wherein the first selected set of active transfer switches controls whether a first selected set of the datacenter hardware receives power from the multiple primary power feeds or from the shared secondary power feed, the method further comprising: selecting the first selected set of the datacenter hardware based on an amount of power consumed by the first selected set of the datacenter hardware such that, after generating the instructions to the first selected set of active transfer switches to not switch to the shared secondary power feed if the primary power feed to which they are connected fails, the shared secondary power feed will be capable of providing sufficient power to the datacenter hardware if the first primary power feed fails.

A sixth example is the method of the fifth example, detecting that the amount of power being consumed by the datacenter hardware from the shared secondary power feed has changed; selecting, in response to the detecting, a second selected set of the datacenter hardware, wherein, if the detecting detected an increase in the amount of power being consumed from the shared secondary power feed, the second selected set is a superset of the first selected set of the datacenter hardware, and, wherein further, if the detecting detected a decrease in the amount of power being consumed from the shared secondary power feed, the second selected set is a subset of the first selected set of the datacenter hardware; and generating, in response to the detecting and the selecting, instructions to a second selected set of active transfer switches to not switch to the shared secondary power feed if the primary power feed to which they are connected fails, the second selected set of active transfer switches controlling whether the second selected set of the datacenter hardware receives power from the multiple primary power feeds or from the shared secondary power feed.

A seventh example is the method of the second example, wherein the first subset of active transfer switches controls whether a first subset of the datacenter hardware receives power from the multiple primary power feeds or from the shared secondary power feed, the method further comprising: selecting the first subset of the datacenter hardware based on what services are provided by the first subset of the datacenter hardware.

An eighth example is the method of the seventh example, further comprising: ranking at least some of the datacenter hardware based on what services are supported by the at least some of the datacenter hardware; wherein the selecting the first subset of the datacenter hardware comprises selecting lowest ranked ones of the ranked datacenter hardware.

A ninth example is the method of the eighth example, wherein the ranking comprises at least one of: assigning datacenter hardware comprising primary storage a higher ranking than datacenter hardware comprising backup storage; assigning datacenter hardware executing computer-executable instructions that provide production services a higher ranking than datacenter hardware executing computer-executable instructions that provide services that are still being tested; assigning datacenter hardware executing computer-executable instructions that provide for-fee services a higher ranking than datacenter hardware executing computer-executable instructions that provide free services; assigning datacenter hardware executing computer-executable instructions that provide unique services a higher ranking than datacenter hardware executing computer-executable instructions that provide fail-over services that can fail-over to other hardware; assigning datacenter hardware performing a greater quantity of input/output operations a higher ranking than datacenter hardware performing a lower quantity of input/output operations; and assigning datacenter hardware executing computer-executable instructions that provide non-geo-replicated services a higher ranking than datacenter hardware executing computer-executable instructions that provide geo-replicated services.

A tenth example is a system comprising: a first primary power feed; a second primary power feed independent of the first primary power feed; a shared secondary power feed independent of both the first and second primary power feeds; a first set of computing hardware, the first set of computing hardware only receiving electrical power from either the first primary power feed or the shared secondary power feed; a second set of computing hardware differing from the first set of computing hardware, the second set of computing hardware only receiving electrical power from either the second primary power feed or the shared secondary power feed; a first set of active transfer switches, wherein each active transfer switch of the first set of active transfer switches controls whether a subset of the first set of computing hardware receives electrical power from the first primary power feed or the shared secondary power feed; a second set of active transfer switches, wherein each active transfer switch of the second set of active transfer switches controls whether a subset of the second set of computing hardware receives electrical power from the second primary power feed or the shared secondary power feed; and a computing device comprising one or more processing units and computer-readable media comprising computer-executable instructions which, when executed by the one or more processing units, cause the computing device to: obtain an amount of power being consumed from the shared secondary power feed by the first and second set of computing hardware; determine that the shared secondary power feed will be incapable of providing sufficient power, either to the first set of computing hardware if the first primary power feed fails, or to the second set of computing hardware if the second primary power feed fails; and generate, in response to the determining, instructions to a first selected set of active transfer switches, from among the first and second sets of active transfer switches, to either: switch back to a primary power feed to which they are connected even if that primary power feed is currently nonoperational; or to not switch to the shared secondary power feed if the primary power feed to which they are connected fails.

An eleventh example is the system of the tenth example, wherein the computer-readable media of the computing device comprise further computer-executable instructions which, when executed by the one or more processing units, cause the computing device to: establish a threshold amount of power consumption such that a remaining power capacity of the shared secondary power feed exceeds a power capacity of at least one of the first or second primary power feeds; and wherein further the computer-executable instructions causing the computing device to perform the determining comprise computer-executable instructions, which, when executed by the one or more processing units, cause the computing device to: determine that the obtained amount of power currently being consumed from the shared secondary power feed exceeds the pre-established threshold amount of power consumption.

A twelfth example is the system of the eleventh example, wherein the computer-readable media of the computing device comprise further computer-executable instructions which, when executed by the one or more processing units, cause the computing device to: re-establish the threshold amount of power consumption when one of the first or second primary power feeds either fails or is repaired of a prior failure.

A thirteenth example is the system of the tenth example wherein the first selected set of active transfer switches controls whether a first selected set of the computing hardware of the first and second set of computing hardware receives power from the first or second primary power feed, respectively, or from the shared secondary power feed; and wherein further the computer-readable media of the computing device comprise further computer-executable instructions which, when executed by the one or more processing units, cause the computing device to: select hardware based on an amount of power consumed by them such that, after generating the instructions to the first selected set of active transfer switches to not switch to the shared secondary power feed if the primary power feed to which they are connected fails, the shared secondary power feed will be capable of providing sufficient power, either to the first set of computing hardware if the first primary power feed fails, or to the second set of computing hardware if the second primary power feed fails.

A fourteenth example is the system of the thirteenth example, wherein the computer-readable media of the computing device comprise further computer-executable instructions which, when executed by the one or more processing units, cause the computing device to: detect that the amount of power being consumed from the shared secondary power feed has changed; select, in response to the detecting, a second selected set of the computing hardware, wherein, if the detecting detected an increase in the amount of power being consumed from the shared secondary power feed, the second selected set is a superset of the first selected set of computing hardware, and, wherein further, if the detecting detected a decrease in the amount of power being consumed from the shared secondary power feed, the second selected set is a subset of the first selected set of computing hardware; and generating, in response to the detecting and the selecting, instructions to a second selected set of active transfer switches to not switch to the shared secondary power feed if the primary power feed to which they are connected fails, the second selected set of active transfer switches controlling whether the second selected set of the computing hardware receives power from the multiple primary power feeds or from the shared secondary power feed.

A fifteenth example is the system of the tenth example wherein the first selected set of active transfer switches controls whether a first selected set of the computing hardware of the first and second set of computing hardware receives power from the first or second primary power feed, respectively, or from the shared secondary power feed; and wherein further the computer-readable media of the computing device comprise further computer-executable instructions which, when executed by the one or more processing units, cause the computing device to: select the first selected set of computing hardware based on what services are supported by the first selected set of computing hardware.

A sixteenth example is the system of the fifteenth example, wherein the computer-readable media of the computing device comprise further computer-executable instructions which, when executed by the one or more processing units, cause the computing device to: rank at least some of the computing hardware of the first and second set of computing hardware based on what services are supported by the at least some of the computing hardware; and wherein further the computer-executable instructions causing the computing device to perform the selecting the first selected set of computing hardware comprise computer-executable instructions, which, when executed by the one or more processing units, cause the computing device to: select lowest ranked ones of the ranked computing hardware.

A seventeenth example is the system of the sixteenth example, wherein the computer-executable instructions causing the computing device to perform the ranking comprise computer-executable instructions, which, when executed by the one or more processing units, cause the computing device to perform at least one of: assign computing hardware comprising primary storage a higher ranking than computing hardware comprising backup storage; assign computing hardware executing computer-executable instructions that provide production services a higher ranking than computing hardware executing computer-executable instructions that provide services that are still being tested; assign computing hardware executing computer-executable instructions that provide for-fee services a higher ranking than computing hardware executing computer-executable instructions that provide free services; assign computing hardware executing computer-executable instructions that provide unique services a higher ranking than computing hardware executing computer-executable instructions that provide fail-over services that can fail-over to other hardware; assign computing hardware performing a greater quantity of input/output operations a higher ranking than computing hardware performing a lower quantity of input/output operations; and assign computing hardware executing computer-executable instructions that provide non-geo-replicated services a higher ranking than computing hardware executing computer-executable instructions that provide geo-replicated services.

A nineteenth example is a computing device comprising: one or more processing units; a communicational connection to a first set of active transfer switches, wherein each active transfer switch of the first set of active transfer switches controls whether a subset of a first set of computing hardware receives electrical power from a first primary power feed or a shared secondary power feed; a communicational connection to a second set of active transfer switches, wherein each active transfer switch of the second set of active transfer switches controls whether a subset of a second set of computing hardware receives electrical power from a second primary power feed or the shared secondary power feed; and computer-readable media comprising computer-executable instructions which, when executed by the one or more processing units, cause the computing device to: obtain an amount of power being consumed from the shared secondary power feed by the first and second set of computing hardware; determine that the shared secondary power feed will be incapable of providing sufficient power, either to the first set of computing hardware if the first primary power feed fails, or to the second set of computing hardware if the second primary power feed fails; and generate, in response to the determining, instructions to a first selected set of active transfer switches, from among the first and second sets of active transfer switches, to either: switch back to a primary power feed to which they are connected even if that primary power feed is currently nonoperational; or to not switch to the shared secondary power feed if the primary power feed to which they are connected fails.

A twentieth example is the computing device of the nineteenth example, wherein the computer-readable media comprise further computer-executable instructions which, when executed by the one or more processing units, cause the computing device to: rank at least some of the computing hardware of the first and second set of computing hardware based on what services are supported by the at least some of the computing hardware; and wherein further the computer-executable instructions causing the computing device to perform the selecting the first selected set of computing hardware comprise computer-executable instructions, which, when executed by the one or more processing units, cause the computing device to: select lowest ranked ones of the ranked computing hardware.

As can be seen from the above descriptions, mechanisms for controlling active transfer switches so as to reduce service impacts due to electrical power interruptions have been presented. In view of the many possible variations of the subject matter described herein, we claim as our invention all such embodiments as may come within the scope of the following claims and equivalents thereto.

We claim:

1. A method of controlling active transfer switches in a datacenter to reduce impact on the provision of services by the datacenter, from electrical power interruptions in the datacenter, the method comprising:
   obtaining an amount of power being consumed by datacenter hardware from a shared secondary power feed;
   determining that the shared secondary power feed will be incapable of providing sufficient power to the datacenter hardware if a first primary power feed fails; and
   generating, in response to the determining, instructions to a first selected set of active transfer switches that switch between a primary power feed and the shared secondary power feed, the instructions instructing the first selected set of active transfer switches to either:
   switch back to the primary power feed to which they are connected even if that primary power feed is currently nonoperational; or
   to not switch to the shared secondary power feed if the primary power feed to which they are connected fails.

2. The method of claim 1, wherein the datacenter comprises:
   multiple primary power feeds, each one of the multiple primary power feeds providing primary power to a distinct subset of the datacenter hardware; and
   the shared secondary power feed, which, by itself, provides backup power to multiple ones of the distinct subsets of the datacenter hardware.

3. The method of claim 2, further comprising: establishing a threshold amount of power consumption such that a remaining power capacity of the shared secondary power feed exceeds a power capacity of one of the multiple primary power feeds; wherein the determining comprises determining that the obtained amount of power currently being consumed by datacenter hardware from the shared secondary power feed exceeds the pre-established threshold amount of power consumption.

4. The method of claim 3, further comprising: re-establishing the threshold amount of power consumption when one of the multiple primary power feeds either fails or is repaired of a prior failure.

5. The method of claim 2, wherein the first selected set of active transfer switches controls whether a first selected set of the datacenter hardware receives power from the multiple primary power feeds or from the shared secondary power feed, the method further comprising: selecting the first selected set of the datacenter hardware based on an amount of power consumed by the first selected set of the datacenter hardware such that, after generating the instructions to the first selected set of active transfer switches to not switch to the shared secondary power feed if the primary power feed to which they are connected fails, the shared secondary power feed will be capable of providing sufficient power to the datacenter hardware if the first primary power feed fails.

6. The method of claim 5, further comprising:
    detecting that the amount of power being consumed by the datacenter hardware from the shared secondary power feed has changed;
    selecting, in response to the detecting, a second selected set of the datacenter hardware, wherein, if the detecting detected an increase in the amount of power being consumed from the shared secondary power feed, the second selected set is a superset of the first selected set of the datacenter hardware, and, wherein further, if the detecting detected a decrease in the amount of power being consumed from the shared secondary power feed, the second selected set is a subset of the first selected set of the datacenter hardware; and
    generating, in response to the detecting and the selecting, instructions to a second selected set of active transfer switches to not switch to the shared secondary power feed if the primary power feed to which they are connected fails, the second selected set of active transfer switches controlling whether the second selected set of the datacenter hardware receives power from the multiple primary power feeds or from the shared secondary power feed.

7. The method of claim 2, wherein the first subset of active transfer switches controls whether a first subset of the datacenter hardware receives power from the multiple primary power feeds or from the shared secondary power feed, the method further comprising: selecting the first subset of the datacenter hardware based on what services are provided by the first subset of the datacenter hardware.

8. The method of claim 7, further comprising ranking at least some of the datacenter hardware based on what services are supported by the at least some of the datacenter hardware; wherein the selecting the first subset of the datacenter hardware comprises selecting lowest ranked ones of the ranked datacenter hardware.

9. The method of claim 8, wherein the ranking comprises at least one of:
    assigning datacenter hardware comprising primary storage a higher ranking than datacenter hardware comprising backup storage;
    assigning datacenter hardware executing computer-executable instructions that provide production services a higher ranking than datacenter hardware executing computer-executable instructions that provide services that are still being tested;
    assigning datacenter hardware executing computer-executable instructions that provide for-fee services a higher ranking than datacenter hardware executing computer-executable instructions that provide free services;
    assigning datacenter hardware executing computer-executable instructions that provide unique services a higher ranking than datacenter hardware executing computer-executable instructions that provide fail-over services that can fail-over to other hardware;
    assigning datacenter hardware performing a greater quantity of input/output operations a higher ranking than datacenter hardware performing a lower quantity of input/output operations; and
    assigning datacenter hardware executing computer-executable instructions that provide non-geo-replicated services a higher ranking than datacenter hardware executing computer-executable instructions that provide geo-replicated services.

10. A system comprising:
    a first primary power feed;
    a second primary power feed independent of the first primary power feed;
    a shared secondary power feed independent of both the first and second primary power feeds;
    a first set of computing hardware, the first set of computing hardware only receiving electrical power from either the first primary power feed or the shared secondary power feed;
    a second set of computing hardware differing from the first set of computing hardware, the second set of computing hardware only receiving electrical power from either the second primary power feed or the shared secondary power feed;
    a first set of active transfer switches, wherein each active transfer switch of the first set of active transfer switches controls whether a subset of the first set of computing hardware receives electrical power from the first primary power feed or the shared secondary power feed;
    a second set of active transfer switches, wherein each active transfer switch of the second set of active transfer switches controls whether a subset of the second set of computing hardware receives electrical power from the second primary power feed or the shared secondary power feed; and
    a computing device comprising one or more processing units and computer-readable media comprising computer-executable instructions which, when executed by the one or more processing units, cause the computing device to:
        obtain an amount of power being consumed from the shared secondary power feed by the first and second set of computing hardware;
        determine that the shared secondary power feed will be incapable of providing sufficient power, either to the first set of computing hardware if the first primary power feed fails, or to the second set of computing hardware if the second primary power feed fails; and
        generate, in response to the determining, instructions to a first selected set of active transfer switches, from among the first and second sets of active transfer switches, to either:
            switch back to a primary power feed to which they are connected even if that primary power feed is currently nonoperational; or
            to not switch to the shared secondary power feed if the primary power feed to which they are connected fails.

11. The system of claim 10, wherein the computer-readable media of the computing device comprise further computer-executable instructions which, when executed by the one or more processing units, cause the computing device to: establish a threshold amount of power consumption such that a remaining power capacity of the shared secondary power feed exceeds a power capacity of at least one of the first or second primary power feeds; and wherein further the computer-executable instructions causing the computing device to perform the determining comprise computer-executable instructions, which, when executed by the one or more processing units, cause the computing device to: determine that the obtained amount of power currently being consumed from the shared secondary power feed exceeds the pre-established threshold amount of power consumption.

12. The system of claim 11, wherein the computer-readable media of the computing device comprise further computer-executable instructions which, when executed by the one or more processing units, cause the computing device to: re-establish the threshold amount of power consumption when one of the first or second primary power feeds either fails or is repaired of a prior failure.

13. The system of claim 10, wherein the first selected set of active transfer switches controls whether a first selected set of the computing hardware of the first and second set of computing hardware receives power from the first or second primary power feed, respectively, or from the shared secondary power feed; and wherein further the computer-readable media of the computing device comprise further computer-executable instructions which, when executed by the one or more processing units, cause the computing device to: select hardware based on an amount of power consumed by them such that, after generating the instructions to the first selected set of active transfer switches to not switch to the shared secondary power feed if the primary power feed to which they are connected fails, the shared secondary power feed will be capable of providing sufficient power, either to the first set of computing hardware if the first primary power feed fails, or to the second set of computing hardware if the second primary power feed fails.

14. The system of claim 13, wherein the computer-readable media of the computing device comprise further computer-executable instructions which, when executed by the one or more processing units, cause the computing device to:

detect that the amount of power being consumed from the shared secondary power feed has changed;

select, in response to the detecting, a second selected set of the computing hardware, wherein, if the detecting detected an increase in the amount of power being consumed from the shared secondary power feed, the second selected set is a superset of the first selected set of computing hardware, and, wherein further, if the detecting detected a decrease in the amount of power being consumed from the shared secondary power feed, the second selected set is a subset of the first selected set of computing hardware; and generating, in response to the detecting and the selecting, instructions to a second selected set of active transfer switches to not switch to the shared secondary power feed if the primary power feed to which they are connected fails, the second selected set of active transfer switches controlling whether the second selected set of the computing hardware receives power from the multiple primary power feeds or from the shared secondary power feed.

15. The system of claim 10, wherein the first selected set of active transfer switches controls whether a first selected set of the computing hardware of the first and second set of computing hardware receives power from the first or second primary power feed, respectively, or from the shared secondary power feed; and wherein further the computer-readable media of the computing device comprise further computer-executable instructions which, when executed by the one or more processing units, cause the computing device to: select the first selected set of computing hardware based on what services are supported by the first selected set of computing hardware.

16. The system of claim 15, wherein the computer-readable media of the computing device comprise further computer-executable instructions which, when executed by the one or more processing units, cause the computing device to: rank at least some of the computing hardware of the first and second set of computing hardware based on what services are supported by the at least some of the computing hardware; and wherein further the computer-executable instructions causing the computing device to perform the selecting the first selected set of computing hardware comprise computer-executable instructions, which, when executed by the one or more processing units, cause the computing device to: select lowest ranked ones of the ranked computing hardware.

17. The system of claim 16, wherein the computer-executable instructions causing the computing device to perform the ranking comprise computer-executable instructions, which, when executed by the one or more processing units, cause the computing device to perform at least one of:

assign computing hardware comprising primary storage a higher ranking than computing hardware comprising backup storage;

assign computing hardware executing computer-executable instructions that provide production services a higher ranking than computing hardware executing computer-executable instructions that provide services that are still being tested;

assign computing hardware executing computer-executable instructions that provide for-fee services a higher ranking than computing hardware executing computer-executable instructions that provide free services;

assign computing hardware executing computer-executable instructions that provide unique services a higher ranking than computing hardware executing computer-executable instructions that provide fail-over services that can fail-over to other hardware;

assign computing hardware performing a greater quantity of input/output operations a higher ranking than computing hardware performing a lower quantity of input/output operations; and assign computing hardware executing computer-executable instructions that provide non-geo-replicated services a higher ranking than computing hardware executing computer-executable instructions that provide geo-replicated services.

18. The system of claim 16, wherein the computer-executable instructions causing the computing device to perform the ranking comprise computer-executable instructions, which, when executed by the one or more processing units, cause the computing device to perform the ranking also based on services being executed by other datacenter hardware that would be impacted if a ranked one of the datacenter hardware failed.

19. A computing device comprising:
one or more processing units;
a communicational connection to a first set of active transfer switches, wherein each active transfer switch of the first set of active transfer switches controls whether a subset of a first set of computing hardware receives electrical power from a first primary power feed or a shared secondary power feed;
a communicational connection to a second set of active transfer switches, wherein each active transfer switch of the second set of active transfer switches controls whether a subset of a second set of computing hardware receives electrical power from a second primary power feed or the shared secondary power feed; and
computer-readable media comprising computer-executable instructions which, when executed by the one or more processing units, cause the computing device to:
obtain an amount of power being consumed from the shared secondary power feed by the first and second set of computing hardware;
determine that the shared secondary power feed will be incapable of providing sufficient power, either to the first set of computing hardware if the first primary power feed fails, or to the second set of computing hardware if the second primary power feed fails; and
generate, in response to the determining, instructions to a first selected set of active transfer switches, from among the first and second sets of active transfer switches, to either:
switch back to a primary power feed to which they are connected even if that primary power feed is currently nonoperational; or
to not switch to the shared secondary power feed if the primary power feed to which they are connected fails.

20. The computing device of claim 19, wherein the computer-readable media comprise further computer-executable instructions which, when executed by the one or more processing units, cause the computing device to: rank at least some of the computing hardware of the first and second set of computing hardware based on what services are supported by the at least some of the computing hardware; and
wherein further the computer-executable instructions causing the computing device to perform the selecting the first selected set of computing hardware comprise computer-executable instructions, which, when executed by the one or more processing units, cause the computing device to: select lowest ranked ones of the ranked computing hardware.

* * * * *